UNITED STATES PATENT OFFICE.

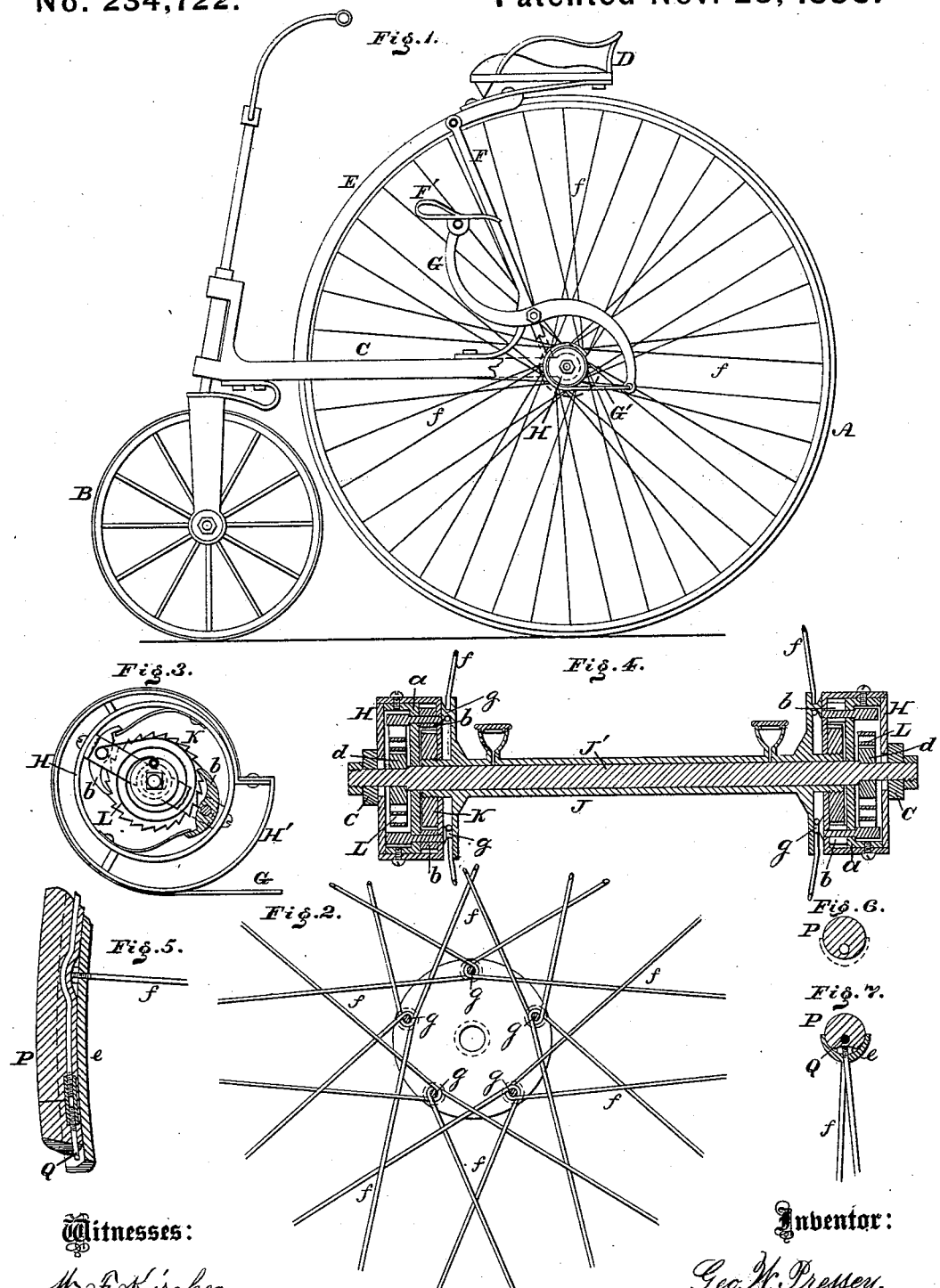

GEORGE W. PRESSEY, OF HAMMONTON, NEW JERSEY, ASSIGNOR OF ONE-FOURTH TO E. L. CROWELL, OF SAME PLACE.

VELOCIPEDE.

SPECIFICATION forming part of Letters Patent No. 234,722, dated November 23, 1880.

Application filed September 6, 1880. (No model.)

*To all whom it may concern:*

Be it known that I, GEORGE W. PRESSEY, a citizen of the United States, residing at Hammonton, in the county of Atlantic, State of New Jersey, have invented a new and useful Improvement in Velocipedes, which improvement is fully set forth in the following specification and accompanying drawings, in which—

Figure 1 is a side elevation of the velocipede embodying my invention. Fig. 2 is an enlarged view of a portion of the wheel thereof. Fig. 3 is a side view, enlarged and partly sectional, of the clutch mechanism and adjacent parts. Fig. 4 is a side view, enlarged, of the axle, clutch mechanism, and portion of the wheel. Fig. 5 is a longitudinal section of a portion of the tire. Figs. 6 and 7 are transverse sections thereof.

Similar letters of reference indicate corresponding parts in the several figures.

My invention consists of a velocipede having its driving-wheel provided with a clutch or pawl-and-ratchet mechanism, which is operated in the forward direction by the foot-treadle, and in the return by the action of a spring, said mechanism and spring being inclosed in a dust-proof casing.

It also consists of the surface of the boxes on which the straps are wound being of a scroll form, so as to increase the power as the straps are unwound.

It also consists in providing the axle with two hubs which have studs on their inner faces, in combination with overlapping V-shaped rods or bars which form the spokes.

It also consists in providing the wheel with a rubber tire having a sectional metallic core formed of a rod, the lengths of which are held together by nuts.

Referring to the drawings, A represents the hind or driving wheel of a velocipede of the order of a bicycle; B, the front steering-wheel; C, the connecting-reach; D, the driver's seat; E, the wheel-guard; F, the braces rising from the reach and supporting the guard and seat; G, the treadles pivoted to the braces F, provided with foot-rests F' and connected at lower ends to straps G', which are attached to the wheel hubs or boxes H of the clutch or pawl-and-ratchet driving mechanism of the hind wheel, A.

J represents a hollow rotary shaft or sleeve, through which is passed a stationary shaft, J', the rear ends of the reach C being immovably connected to the latter.

Each box H is of two parts, divided by the partition *a*. The inner parts are loosely fitted on the ends of the hollow shaft J, and carry pawls *b*, which engage with ratchets K, rigidly connected to said ends of the shaft. The outer parts ride freely on the ends of the stationary shaft J', and have each connected to them one end of a spring, L, whose other end is fixed to a disk, *d*, immovably connected to the end of the stationary shaft. The boxes are closed at circumference and sides, and as they inclose the ratchets, pawls, and springs, said inclosed parts are protected from dust and dirt. The exterior surfaces of the hubs or boxes H are of scroll form or provided with scroll-bands, as at H', and the straps G' are wound thereon, as more readily shown in Fig. 3.

It will be seen that when the foot-rests F' are depressed the lower ends of the treadles G are raised. This draws on and unwinds the straps G' from the hubs or boxes H, causing the rotation of the latter. The pawls *b* are carried around with the boxes, and as they engage with the ratchets K, the latter are rotated, and rotation is thereby imparted to the hollow shaft J and thus to the wheel. The springs L are coiled or wound up by the rotation of the boxes, and when the treadles have been depressed to full extent and let go the springs exert their power, rotate the boxes in opposite direction, the pawls riding freely over the ratchets, and wind the straps G' on their surfaces, thus lowering the bottom ends of the treadles and restoring the upper ends to their normal positions, ready to be forced down anew. The operations are repeated, and thus the bicycle is propelled, the motions imparted to it being powerful and rapid, and these are increased by the scrolls H', for as the straps G' unwind therefrom they gradually approach the center of the boxes, and thus obtain greater power thereon.

The wheel A is formed of the rim *e*, two hubs, and wire spokes *f* in two series, each passing from one hub and both united to the rim or tire. A piece of wire is passed from the rim or tire, to which it is secured by a nut to the hub, then bent around a stud, $g$, on the hub, and continued at an acute angle or bent into V shape, joining the rim or tire at a different place from the starting-point, the termination being secured to the rim or tire by a nut. Another piece of V-shaped wire is connected at its ends to the rim or tire, and at its angular part to one of the studs $g$, and the other pieces are located and secured, the arrangement being such that the angles of at least two pieces are attached to the same stud, although more pieces may be so attached, it being noticed that while in the present case there are five studs, $g$, on each hub, there are ten V-shaped spokes in each series of spokes. Furthermore, in disposing of the spokes $f$, those that are contiguous are passed over and under each other, both at the studs $g$ and beyond the peripheries of the hubs, thus forming an interlacing of the spokes, which provides a structure which, though light, is exceedingly strong and durable. It will also be noticed that the spokes are tangential to the hub, instead of radiating therefrom. By this provision the strain is always thrown on all of the spokes alike, causing a pull or tension, but never a thrust, thus preventing buckling of the spokes.

The rim $e$ of the wheel is concave, and in the same is placed a rubber tire, P, which is tubular or perforated longitudinally, in order to receive a metallic rod or core, Q, the opening of the tire being eccentric, so as to come nearer to the rim $e$ and leave a greater thickness of material for the tread. The ends of the rod or core are, respectively, right and left screw-threaded, and have fitted to them a sleeve, R, for securing and tightening purposes. The tire and core are cut the proper length, the core is run through the tire, and the latter applied on the rim of the wheel. The sleeve is fitted to the ends of the core and tightened, thus drawing together said ends, and consequently those of the tire, whereby the rubber tube is firmly secured to the rim, as shown in Fig. 5.

I am aware that it is not new to construct a wheel with a rubber tire and a rod forming a metallic core therefor. I do not claim such construction.

Having thus described my invention, what I claim as new, and desire to secure by Letters Patent, is—

1. A velocipede having a hollow rotary shaft and an inclosed stationary shaft, a wheel hub or box loosely fitted on both shafts, a ratchet fixed to the rotary shaft, a pawl or pawls hung from the hubs or boxes, and a returning-spring connected to the box or hub and the stationary shaft, substantially as and for the purpose set forth.

2. The combination of a velocipede-axle having a ratchet fixed thereon with a hollow pulley having a pawl for engaging therewith, a band and treadle for rotating said pulley, and a spring for reversing the motion of said pulley, the latter entirely inclosing the pawl, ratchet, and spring.

3. The combination, with the strap G', of the wheel hub or box having a scroll surface, substantially as and for the purpose set forth.

4. In combination with a velocipede-axle having two hubs with studs on their inner faces, a double series of spokes, each series consisting of V-shaped pairs, and each stud lying within the points of at least two pairs, substantially as set forth.

5. A wheel having a rubber tire, which is provided with a metallic core, Q, said core consisting of a length or lengths which are screw-threaded and secured together by nuts or internally-threaded sleeves, substantially as set forth.

GEORGE WASHINGTON PRESSEY.

Witnesses:
JOHN A. WIEDERSHEIM,
W. F. KIRCHER.